United States Patent
Schneider et al.

(10) Patent No.: US 7,514,890 B2
(45) Date of Patent: *Apr. 7, 2009

(54) SURGICAL MACHINE AND METHOD FOR CONTROLLING AND/OR REGULATING A SURGICAL MACHINE

(75) Inventors: Juergen Schneider, Tuttlingen (DE); Roland Alois Hoegerle, Tuttlingen (DE); Harald Konrath, Rottenburg-Hailfingen (DE)

(73) Assignee: Aesculap AG, Tuttlingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/009,816

(22) Filed: Jan. 22, 2008

(65) Prior Publication Data

US 2008/0118234 A1    May 22, 2008

Related U.S. Application Data

(63) Continuation of application No. 11/649,717, filed on Jan. 3, 2007, now Pat. No. 7,362,062, which is a continuation of application No. PCT/EP2005/007759, filed on Jul. 16, 2005.

(30) Foreign Application Priority Data

Jul. 30, 2004    (DE) ....................... 10 2004 038 415

(51) Int. Cl.
    *H02P 7/00*    (2006.01)
(52) U.S. Cl. ................. 318/432; 318/434; 318/609
(58) Field of Classification Search .............. 388/928.1, 388/811, 827, 800; 318/432, 609, 434, 400.02
    See application file for complete search history.

(56) References Cited

U.S. PATENT DOCUMENTS

| | | | |
|---|---|---|---|
| 2,244,683 | A | 6/1941 | Fisher |
| 4,091,880 | A | 5/1978 | Troutner et al. |

(Continued)

FOREIGN PATENT DOCUMENTS

DE    80 00 592    4/1980

(Continued)

OTHER PUBLICATIONS

Ying-Yu Tzou, et al., "FPGA-Based SVPWM Control IC for 3-Phase PWM Inverters" Proceedings of the 22$^{nd}$ International Conference on Industrial Electronics, Control and Instrumentation, Aug. 1996, pp. 138-143 (XP002360956).

(Continued)

*Primary Examiner*—Karen Masih
(74) *Attorney, Agent, or Firm*—Lipsitz & McAllister, LLC

(57) ABSTRACT

To improve a surgical machine with a sensorless electric motor comprising a rotor and at least two motor windings, and with a motor controller for controlling and/or regulating the electric motor, so that the electric motor is operable with optimum efficiency at low rotational speeds and a starting of the motor in accordance with the purpose, also under load, is enabled, it is proposed that a space vector pulse width modulation (SVPWM) method for controlling and/or regulating the electric motor, in which all motor windings are able to be simultaneously supplied with electric current, be performable with the motor controller. A method for controlling and/or regulating a surgical machine is also proposed.

27 Claims, 9 Drawing Sheets

U.S. PATENT DOCUMENTS

| | | |
|---|---|---|
| 5,107,151 A | 4/1992 | Cambier |
| 5,268,622 A | 12/1993 | Philipp |
| 5,677,605 A | 10/1997 | Cambier et al. |
| 5,689,159 A | 11/1997 | Culp et al. |
| 5,747,953 A | 5/1998 | Philipp |
| 5,994,867 A | 11/1999 | Birk et al. |
| 6,013,991 A | 1/2000 | Philipp |
| 6,059,806 A | 5/2000 | Hoegerle |
| 6,086,544 A | 7/2000 | Hibner et al. |
| 6,249,094 B1 | 6/2001 | Zeh et al. |
| 6,643,149 B2 | 11/2003 | Arnet et al. |
| 6,819,078 B2 | 11/2004 | Ho |
| 6,885,163 B2 | 4/2005 | Heidrich |
| 2002/0044472 A1 | 4/2002 | Arnet et al. |
| 2003/0155878 A1 | 8/2003 | Murai |
| 2005/0123408 A1* | 6/2005 | Koehl .......................... 417/53 |
| 2006/0071541 A1 | 4/2006 | Berg |
| 2006/0119305 A1 | 6/2006 | Lee et al. |

FOREIGN PATENT DOCUMENTS

| | | |
|---|---|---|
| DE | 198 46 831 | 4/2000 |
| DE | 202 02 724 | 6/2002 |
| DE | 20 2004 006 724 | 7/2004 |
| DE | 10 2004 020 808 | 11/2005 |
| WO | 96/01521 | 1/1996 |
| WO | 97/50171 | 12/1997 |
| WO | 98/06338 | 2/1998 |
| WO | 03/052919 | 6/2003 |
| WO | 2004/036755 | 4/2004 |

OTHER PUBLICATIONS

Felix Jenny/Dieter Wüest, "Steuerverfahren für selbstgeführte Stromrichter", 1995 vdf Hochschulverlag AG an der ETH Zürich und B.G. Teubner Stuttgart (10 pages).

* cited by examiner note:
'1'=E/2
'0'=-E/2

US 7,514,890 B2

SURGICAL MACHINE AND METHOD FOR CONTROLLING AND/OR REGULATING A SURGICAL MACHINE

This application is a continuation of commonly owned co-pending U.S. patent application Ser. No. 11/649,717 filed on Jan. 3, 2007, which is a continuation of international application number PCT/EP2005/007759 of Jul. 16, 2005 and claims the benefit of German application number 10 2004 038 415.0 of Jul. 30, 2004, each of which are incorporated herein by reference in their entirety and for all purposes.

BACKGROUND OF THE INVENTION

The present invention relates to a surgical machine with a sensorless electric motor comprising a rotor and at least two motor windings, and with a motor controller for controlling and/or regulating the electric motor.

The present invention further relates to a method for controlling and/or regulating a surgical machine with a sensorless electric motor comprising a rotor and at least two motor windings, and with a motor controller for controlling and/or regulating the electric motor.

Machines with a power supply which is independent of the mains power supply are being increasingly used in surgery. As a result, converter circuits have to be made available for batteries or accumulators normally used as power supplies, so as to provide time-dependent voltage and current courses required for operating an electric motor with a plurality of, as a rule, three, motor windings, from the DC voltages supplied by the power supplies.

Owing to the power supply being independent of the mains power supply, the electric motor has to be electronically commutated. However, in particular, at low motor rotational speeds, i.e., at rotational speeds of less than 1000 revolutions per minute, increased demands are made on the motor control and/or regulation. Since, in addition, high demands are made on optimum starting behavior of the motor under load and on its dynamics, and, at the same time, the best possible efficiency at each operating point should be achieved, it is necessary to determine the position or location of the rotor of the motor, which is usually formed by a magnet. Only the precise rotor position makes it possible for the coils referred to as motor or stator windings to be supplied with electric current, in accordance with the purpose, at the required point in time of commutation.

It is known to use sensor systems, for example, digital or analog Hall systems, for position recognition. A disadvantage of these configurations is that position sensors have to be integrated into the motor and connected to the motor controller. Consequently, corresponding contacts have to be provided for each position sensor if the motor controller is not fixedly connected to the electric motor. This may result in contact corrosion during cleaning, in particular, sterilization of the machine, and, in the worst case, in the machine being put out of operation.

It is also known to use sensorless rotor position recognition methods for applications where high requirements are not made on the dynamics, the starting torque and the motor quality in the range of low rotational speeds of the motor. Since in conventional electronic commutation methods for electric motors, one motor winding is always not supplied with electric current, the CEMF (counterelectromotive force) is measured at the motor winding that is not supplied with electric current and is evaluated for determining an actual rotational speed of the motor.

The above-described, known controlling and regulating methods for surgical machines either require increased circuitry expenditure and additional components, in particular, sensor systems with position sensors, or are unsuitable for specifically starting the electric motor from a standstill under load and operating the electric motor at very low rotational speeds with a high degree of running smoothness.

The object underlying the present invention is, therefore, to so improve a surgical machine and a method for controlling and regulating a surgical machine of the kind described at the outset that the electric motor is operable with optimum efficiency at low rotational speeds, and a starting of the motor in accordance with the purpose, also under load, is enabled.

SUMMARY OF THE INVENTION

This object is accomplished in a surgical machine of the kind described at the outset, in accordance with the invention, in that a space vector pulse width modulation (SVPWM) method for controlling and/or regulating the electric motor, in which all motor windings are able to be simultaneously supplied with electric current, is performable with the motor controller.

The designing of the motor controller such that the surgical machine can be controlled and/or regulated by a space vector pulse width modulation (SVPWM) method improves, in particular, starting of the motor and motor operation at low rotational speeds. The reason for this is, in particular, that differently from a conventional pulse width modulation (PWM) method, all motor windings are simultaneously supplied with electric current. In particular, in an electric motor with three motor windings, this means that not only two, but all three motor windings are supplied with electric current. Therefore, in the case of three motor windings, 60°-phases of a rotor movement of the electric motor relative to the motor windings can be infinitely varied. In conventional pulse width modulation (PWM) methods or pulse width modulation (PWM) methods used so far, a field angle of the stator field could not be infinitely altered, but only in 60°-steps. Accordingly, a considerably smoother running of the motor can be achieved, above all, at low rotational speeds. In addition, the starting of the motor can be quite specifically defined independently of a position of the rotor of the electric motor.

Optimum design of the machine is accomplished when the motor controller comprises a control unit and a power unit. In this way, in particular, power consumption of the machine is minimized when the electric motor is at a standstill.

Electronic commutation can be achieved in a simple way by the power unit respectively comprising two power transistors for each of the at least two motor windings. Thus, positive and negative voltages in relation to a reference potential can be applied in a simple way to the at least two motor windings, even when only one DC voltage source is available as power supply.

The machine is particularly maintenance-friendly when the electric motor is a brushless DC motor. In particular, the electric motor can also be electronically commutated.

In principle, it is conceivable to dispense with determination of the rotor position of the rotor of the electric motor. However, in particular, in order to optimize starting of the electric motor under load, it is expedient for a rotor position of the electric motor to be determinable for controlling and/or regulating the supplying of the at least two motor windings with electric current. With a knowledge of the rotor position, the field angle of the stator field generated by the motor windings supplied with electric current can be infinitely switched further by the space vector pulse width modulation (SVPWM) method so as to obtain optimum efficiency of the motor.

In accordance with a preferred embodiment of the invention, it may be provided that, to determine the rotor position of the electric motor, at least one of the at least two motor windings is separable from a power supply of the machine for a time interval $t_{interrupt}$, that a CEMF (counterelectromotive force) of the at least one of the at least two motor windings is measurable during the time interval $t_{interrupt}$, and that an actual position of the rotor is calculatable from the measured CEMF (counterelectromotive force). In other words, this means that the simultaneous supplying with electric current is briefly interrupted in a specific manner for a certain time interval in the space vector pulse width modulation (SVPWM) method, namely at one, several or all of the motor windings. During the brief interruption, the CEMF (counterelectromotive force) can then be determined at one, several or all of the motor windings, and a position of the rotor relative to the motor windings can be concluded from its size.

A determination of the rotor position can be further improved when all motor windings are simultaneously separable from the power supply of the machine for the time interval $t_{interrupt}$. The CEMF (counterelectromotive force) can thus be simultaneously determined at all motor windings, and any inaccuracies in the determination of the CEMF (counterelectromotive force) at only one motor winding will, therefore, have a less serious effect.

In order that the time interval $t_{interrupt}$ will remain as short as possible, it is expedient for the voltages applied to the at least two motor windings to be measurable before or at the start of the time interval $t_{interrupt}$ or before the measuring of the CEMF (counterelectromotive force), and for that motor winding at which the lowest voltage is measured to be connectable to a predetermined voltage potential. A time for the transient phenomenon of the system is minimized by this procedure, i.e., the CEMF (counterelectromotive force) can be measured after a minimum waiting time.

The design of the surgical machine is particularly simple when the predetermined voltage potential is ground.

In order to further optimize determination of the rotor position, it is advantageous for the motor controller to be so designed that the CEMF (counterelectromotive force) during the time interval $t_{interrupt}$ is not measured until after a transient time $t_{transient}$. In other words, this means that, for example, the supplying of at least one motor winding with electric current is interrupted, i.e., the time interval $t_{interrupt}$ starts, and only after the transient time $t_{transient}$, which is usually shorter than the time interval $t_{interrupt}$, is the CEMF (counterelectromotive force) measured.

To further improve the accuracy with which the rotor position is determined, it is expedient for the motor controller to be so designed that to determine the CEMF (counterelectromotive force), a voltage course is measurable at the motor winding or motor windings not connected to the predetermined voltage potential, and for the transient time $t_{transient}$ to correspond at least to a time $t_{constant}$ until the voltages applied to the motor winding or motor windings not connected to the predetermined voltage potential are constant or almost constant in the course of time. This configuration allows the transient time $t_{transient}$ to be varied according to requirements. By determining the time $t_{constant}$, the transient time $t_{transient}$ can be set in a specific manner and minimized.

The motor controller is preferably so designed that a constant value is predetermined for the time interval $t_{interrupt}$. The motor controller can thereby be considerably simplified.

In accordance with an alternative embodiment of the machine, it can, however, be advantageous for the motor controller to be so designed that the time interval $t_{interrupt}$ is alterable. In particular, the time interval $t_{interrupt}$ can thereby be increased or reduced if the time $t_{constant}$ is longer than the initially predetermined time interval $t_{interrupt}$.

Optimized operation of the machine can be achieved by the motor controller being so designed that the duration of the time interval $t_{interrupt}$ is predeterminable such that during the time interval $t_{interrupt}$, the voltages applied to the motor winding or motor windings not connected to the predetermined voltage potential assume a constant or almost constant voltage value in the course of time. In particular, in the case of short fall times, i.e., when the time $t_{constant}$ is very short, the time interval $t_{interrupt}$ can be adapted accordingly, whereby the interruption in the supplying of electric current to the motor windings becomes minimally short. The running smoothness of the motor, in particular, at low rotational speed and during the starting, is thereby improved.

The motor controller is preferably so designed that the time interval $t_{interrupt}$ is increasable when the time $t_{constant}$ is greater than the time interval $t_{interrupt}$, and/or that the time interval $t_{interrupt}$ is reducible when the $t_{constant}$ is less than the time interval $t_{interrupt}$. It is thereby ensured that the time interval $t_{interrupt}$ will never be longer than absolutely necessary to determine as accurately as possible the CEMF (counterelectromotive force) for detecting the rotor position.

In principle, it is conceivable to periodically vary the time interval $t_{interrupt}$. It is, however, expedient for the motor controller to be so designed that the time interval $t_{interrupt}$ is alterable stepwise per revolution. In particular, it is expedient for the time interval $t_{interrupt}$ to be stepwise increasable or reducible. In this way, the time interval $t_{interrupt}$ can be altered until it corresponds at least to the time $t_{constant}$, so as to be able to determine the CEMF (counterelectromotive force) safely and accurately.

In accordance with a preferred embodiment of the invention, it may be provided that the motor controller is so designed that a specified position of the rotor is comparable with the actual position of the rotor as determined from the CEMF (counterelectromotive force) measurement, and that a field angle of the space vector pulse width modulation (SVPWM) is adjustable in accordance with the difference determined between specified position and actual position of the rotor. The motor controller thus determines a deviation of the actual position from the specified position of the rotor and adjusts the field angle of the stator field generated by the motor windings on the basis of the position deviation determined. Optimum efficiency of the motor can thus be achieved.

To further increase the accuracy in determining the CEMF (counterelectromotive force), it is advantageous for the motor controller to be so designed that the CEMF (counterelectromotive force) is only measurable after the motor current of at least one of the at least two motor windings has dropped to zero. Any measurement errors caused by the flowing of a motor current when determining a CEMF (counterelectromotive force) can thus be avoided.

In principle, it is conceivable to choose a DC voltage source which is dependent on the mains power supply as power supply for the surgical machine. It is, however, particularly advantageous for a power supply which is independent of the mains power supply to be provided as power supply for the machine. In particular, the use of a battery or an accumulator is advantageous. Use of a fuel cell is also conceivable. The machine can thus be used in a desired manner without any annoying cable connections during surgical procedures.

It is expedient for the mains-independent power supply and the motor controller to form a unit, and for the unit to be detachably connectable to the machine. This has, in particular, the advantage that all parts of the machine that are sensitive to heat and moisture can be removed for cleaning purposes, for example, for sterilization of the machine. The construction of the motor controller and the mains-independent power supply as a unit shortens the time required for preparing the surgical machine for use.

The design of the surgical machine is particularly simple when the electric motor comprises three motor windings.

In accordance with a further preferred embodiment of the invention it may be provided that the entire rotational speed range of the surgical machine is divided into at least one lower rotational speed range for low rotational speeds and at least one upper rotational speed range for higher rotational speeds than those in the at least one lower rotational speed range, and that the motor controller is so designed that the space vector pulse width modulation (SVPWM) method is performable in the at least one lower rotational speed range. Such further development of a surgical machine has the advantage that controlling and/or regulating methods that are best suited for the rotational speed range can be performed for controlling and/or regulating the surgical machine. Performance of the space vector pulse width modulation (SVPWM) method is expedient for the lower rotational speed range because this method allows a smooth running of the motor, in particular, during the starting of the motor and at low rotational speeds.

It is also expedient for a second method for controlling and/or regulating the surgical machine, which is a pulse width modulation (PWM) method, to be performable in the at least one upper rotational speed range. In particular, performance of a conventional, three-phase carrier-supported pulse width modulation (PWM) method at high rotational speeds instead of the space vector pulse width modulation (SVPWM) method has advantages for the efficiency of the surgical machine. Above all, at higher rotational speeds determination of the rotor position becomes difficult with the space vector pulse width modulation (SVPWM) method, and, in addition, this method damps the electric motor at high rotational speeds in an undesirable manner, which, in turn, negatively affects its efficiency.

It is expedient for a rotational speed limit value between the at least one lower rotational speed range and the at least one upper rotational speed range to be alterable. In other words, this means that it is possible to switch over between a first and a second controlling and/or regulating method at the rotational speed limit value. If, for example, a different controlling and/or regulating method is desired or changed for the upper rotational speed range, an unalterable rotational speed limit value for switching over between the lower and the upper rotational speed ranges can, for example, negatively influence the efficiency of the machine, and, therefore, a changing of the rotational speed limit value has positive effects on the efficiency of the machine.

In accordance with a further preferred embodiment of the invention it may be provided that the motor controller is so designed that a switchover from the space vector pulse width modulation (SVPWM) method to the pulse width modulation (PWM) method takes place at a first switchover rotational speed, and that a switchover from the pulse width modulation (PWM) method to the space vector pulse width modulation (SVPWM) method takes place at a second switchover rotational speed. For example, the first switchover rotational speed can have a higher value than the second switchover rotational speed, so as to prevent a constant switching-over between different controlling and/or regulating methods in the area of the switchover rotational speed during operation of the surgical machine. A smooth running of the motor, in particular, in the limit area, would otherwise no longer be guaranteed. In the described case, a kind of hysteresis results when accelerating and decelerating the rotational speed, so that in the case of rotational speeds between the two switchover rotational speeds, either the one or the other controlling and/or regulating method is performed in the given situation.

In principle, it is conceivable to so design the surgical machine that switchover between different controlling and/or regulating methods can be carried out manually. However, the motor controller is preferably so designed that the switchover from the space vector pulse width modulation (SVPWM) method to the pulse width modulation (PWM) method takes place automatically at the transition from the at least one lower rotational speed range to the at least one upper rotational speed range, and vice versa. The person operating the machine can then concentrate totally on its surgical application and need not attend to the switching-over from the lower to the upper rotational speed range, and vice versa.

The object set forth at the outset is also accomplished with a method of the kind described at the outset, in accordance with the invention, in that a space vector pulse width modulation (SVPWM) method is performed with the motor controller.

Such further development of the method described at the outset has the advantage that all the motor windings can be simultaneously supplied with electric current, thereby making it possible for a field angle of the stator field which is predeterminable by the motor windings supplied with electric current to be infinitely adjusted and varied as desired. In particular, when starting the electric motor and at low rotational speeds, optimum operation and smooth running of the electric motor are thereby achieved.

It is advantageous for the motor controller to comprise a control unit and a power unit.

It is expedient for the power unit to respectively comprise two power transistors for each of the at least two motor windings. In particular, this makes it possible to use a DC voltage source as power supply.

It may preferably be provided that the electric motor is a brushless DC motor. The maintenance friendliness of the surgical machine is thereby improved.

To enable the electric motor to be optimally supplied with electric current, it is advantageous for a rotor position of the electric motor to be determined for controlling and/or regulating the supplying of the at least two motor windings with electric current. This enables the motor windings to be supplied with electric current in dependence upon the rotor position. Thus, a field angle of the stator field generated by the motor windings supplied with electric current can be optimally adapted to the rotor position, and, therefore, smooth operation and gentle starting of the electric motor can be ensured.

To determine the rotor position of the electric motor, it is expedient for at least one of the at least two motor windings to be separated from a power supply of the machine for a time interval $t_{interrupt}$, for the CEMF (counterelectromotive force) of the at least one of the at least two motor windings to be measured during the time interval $t_{interrupt}$, and for an actual position of the rotor to be calculated from the measured CEMF (counterelectromotive force). Since all motor windings are normally simultaneously supplied with electric current in the space vector pulse width modulation (SVPWM)

method, a CEMF (counterelectromotive force) can only be determined when the supply of electric current to at least one motor winding is interrupted. The voltage dropping at the motor winding that is not supplied with electric current for a short time on account of electromagnetic induction can then be measured as CEMF (counterelectromotive force), and the actual position of the rotor calculated from its value.

Preferably, all the motor windings are simultaneously separated from the power supply of the machine for the time interval $t_{interrupt}$. This opens up the possibility of simultaneously determining the CEMF (counterelectromotive force) at all motor windings and of thereby improving the accuracy with which the actual position of the rotor is determined.

In accordance with a preferred variant of the method according to the invention it may be provided that the voltages applied to the at least two motor windings are measured before or at the start of the time interval $t_{interrupt}$ or before the measuring of the CEMF (counterelectromotive force), and that that motor winding at which the lowest voltage is measured is connected to a predetermined voltage potential. Since, in principle, the CEMF (counterelectromotive force) of all motor windings does not have to be measured in order to determine the actual position of the rotor, the CEMF (counterelectromotive force) can be determined particularly quickly by the proposed further development of the method. In particular, a transient phenomenon can thereby be optimized and shortened.

The predetermined voltage potential is preferably ground.

To enable even more accurate determination of the rotor position, it is expedient for the CEMF (counterelectromotive force) during the time interval $t_{interrupt}$ not to be measured until after a transient time $t_{transient}$. For example, the transient time can be awaited directly from the start of the time interval $t_{interrupt}$. By awaiting the transient time $t_{transient}$ determination of a wrong value for the CEMF (counterelectromotive force) can be avoided, from which, in turn, a wrong actual position of the rotor would be deduced.

In accordance with a further preferred variant of the method according to the invention it may be provided that to determine the CEMF (counterelectromotive force), a voltage course is measured at the motor winding or motor windings not connected to the predetermined voltage potential, and that the transient time $t_{transient}$ corresponds at least to a time $t_{constant}$ until the voltages applied to the motor winding or motor windings not connected to the predetermined voltage potential are constant or almost constant in the course of time. The determination of the voltage course at the motor winding or motor windings makes it possible to determine the CEMF (counterelectromotive force) directly after the transient phenomenon. In this way, the time interval $t_{interrupt}$ can be minimized, which contributes to improved running smoothness and improved starting behavior of the motor.

The method according to the invention becomes particularly simple when a constant value is predetermined for the time interval $t_{interrupt}$. However, the actual position can be determined considerably more accurately and, in addition, the running smoothness of the electric motor further improved when the time interval $t_{interrupt}$ is altered during operation of the machine. In particular, when the transient time $t_{transient}$ lasts longer than the time interval $t_{interrupt}$, the time interval can be adapted accordingly to the transient time, so that the CEMF (counterelectromotive force) can be determined within the time interval $t_{interrupt}$.

It is advantageous for the duration of the time interval $t_{interrupt}$ to be predetermined such that during the time interval $t_{interrupt}$ the voltages applied to the motor winding or motor windings not connected to the predetermined voltage potential assume a constant or almost constant voltage value in the course of time. It is thus possible to determine the CEMF (counterelectromotive force) at each desired motor winding when, following the transient phenomenon of the system, induced voltages are constant or substantially constant at the motor winding or motor windings. This increases the accuracy with which the rotor position is determined.

It may preferably be provided that the time interval $t_{interrupt}$ is increased when the time $t_{constant}$ is greater than the time interval $t_{interrupt}$, and/or that the time interval $t_{interrupt}$ is reduced when the time $t_{constant}$ is less than the time interval $t_{interrupt}$. This procedure ensures that the time interval $t_{interrupt}$ will never be longer than necessary. This guarantees a particularly smooth running of the motor.

It is expedient for the time interval $t_{interrupt}$ to be periodically altered stepwise. In particular, this can be carried out per revolution of the rotor or with a sampling rate which is smaller than the modulation frequency of the space vector pulse width modulation (SVPWM) method or of the pulse width modulation (PWM) method. The stepwise alteration can, in particular, be an increase or a reduction. Such further development of the method according to the invention enables continuous adaptation of the time interval $t_{interrupt}$ to the interruption time actually required to measure the CEMF (counterelectromotive force) at least one motor winding in the required manner.

After measuring the CEMF (counterelectromotive force), all motor windings are preferably reconnected to the power supply of the machine. This can be done directly or with time delay. The quicker the motor lines are reconnected to the power supply of the machine, the shorter is the time interval $t_{interrupt}$ and the smoother the running of the motor.

It can also be advantageous for a specified position of the rotor to be compared with the actual position of the rotor as determined from the measurement of the CEMF (counterelectromotive force), and for a field angle of the space vector pulse width modulation (SVPWM) to be adjusted in accordance with the difference determined between specified position and actual position of the rotor. This adjustment ensures that the electric motor is supplied with electric current with optimum efficiency.

The CEMF (counterelectromotive force) is preferably only measured after the motor current of at least one of the at least two motor windings has dropped to zero. Measurement errors can thus be avoided in a simple way when determining the CEMF (counterelectromotive force). This increases the accuracy with which the rotor position is determined.

A mains-independent power supply is advantageously used for supplying the machine with power. In particular, this can be a battery or an accumulator. The machine can thus be operated without cables.

In accordance with a further preferred variant of the method according to the invention it may be provided that the mains-independent power supply and the motor controller form a unit, and that the unit is connected to the machine before the machine is put into operation. In this way it is possible to clean the surgical machine separately from the power supply and the motor controller. Provision of one unit also facilitates joining and preparation of the machine for surgical application.

To avoid premature discharge, in particular, self-discharge, of the mains-independent power supply, it is advantageous for a processor of the motor controller to not be connected to the mains-independent power supply until the electric motor is connected to the motor controller. Processors of motor controllers usually have a considerably higher power consumption than other components of the controller. Self-discharge of the mains-independent power supply can be avoided by activation of the motor controller only being made possible after connection of the motor controller to the electric motor.

The method according to the invention may be performed particularly simply when an electric motor with three motor windings is used.

It may be advantageously provided that the entire rotational speed range of the surgical machine is divided into at least one lower range for low rotational speeds and into at least one upper range for higher rotational speeds than those in the at least one lower rotational speed range, and that the space vector pulse width modulation (SVPWM) method is performed in the at least one lower rotational speed range. The space vector pulse width modulation (SVPWM) method is particularly advantageous for low rotational speeds, but at higher rotational speeds can result in a damping of the motor and hence in a drop in the efficiency of the motor. It is, therefore, advantageous to provide a different controlling and/or regulating method for controlling the electric motor in the upper rotational speed range.

It is particularly advantageous for a second method for controlling and/or regulating the surgical machine, which is a pulse width modulation (PWM) method, to be performed in the at least one upper rotational speed range. Performance of this method in the upper rotational speed range has the advantage that undesirable damping of the motor owing to use of the space vector pulse width modulation (SVPWM) method cannot occur. In other words, the efficiency of the electric motor is improved over virtually the entire rotational speed range by performing two different controlling and/or regulating methods.

It is expedient for a rotational speed limit value between the at least one lower rotational speed range and the at least one upper rotational speed range to be altered. Depending on which controlling and/or regulating method is used in the upper rotational speed range, a switching-over between the two methods can be carried out at a different rotational speed value. The rotational speed limit value is preferably so selected that the efficiency of the two methods is optimal.

It is particularly advantageous for a switchover from the space vector pulse width modulation (SVPWM) method to the pulse width modulation (PWM) method to take place at a first switchover rotational speed, and for a switchover from the pulse width modulation (PWM) method to the space vector pulse width modulation (SVPWM) method to take place at a second switchover rotational speed. This further development of the method according to the invention avoids constant switching-over between the upper and the lower rotational speed ranges in the area of a rotational speed limit value. The running smoothness of the motor is thereby significantly increased.

It is particularly expedient for the switchover from the space vector pulse width modulation (SVPWM) method to the pulse width modulation (PWM) method to take place automatically at the transition from the at least one lower rotational speed range to the at least one upper rotational speed range, and vice versa. This means that an operator need not switch over manually between two different controlling and/or regulating methods, but can concentrate on the use and operation of the machine.

The following description of example embodiments of the invention serves for further explanation in conjunction with the drawings.

DETAILED DESCRIPTION

Figure 1:
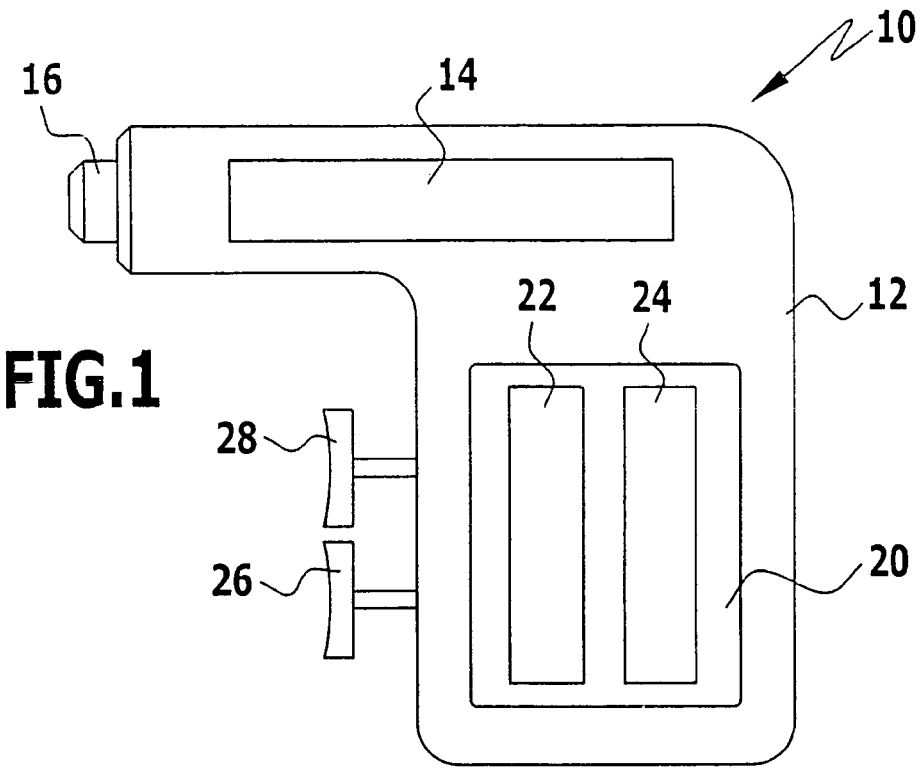
FIG. 1: is a schematic representation of a surgical accumulator machine.

FIG. 1 shows a surgical accumulator machine generally designated by reference numeral 10, which comprises a housing 12, in one part of which a sensorless electric motor 14, which drives a drive shaft, not shown, of the accumulator machine 10, is arranged parallel to the longitudinal axis of this housing part. At the end of the drive shaft there is arranged a coupling 16, by means of which the accumulator machine can be connected to any kind of tool, for example, drills, mills, chisels and also saws.

A handle 18, into which a power pack 20 is insertable, protrudes transversely from the housing part of the housing 12 that receives the electric motor 14. The power pack 20 comprises a rechargeable battery 22 and a motor controller 24. A power/speed push-button 26 and an operating mode selector switch 28, which can be pressed into the handle 18 substantially parallel to a longitudinal axis of the electric motor 14, are provided for starting operation of the accumulator machine 10.

The electric motor 14 is a sensorless brushless DC motor, i.e., there are no rotational speed detection sensors for detecting a rotor movement or a position of a rotor magnet, hereinbelow referred to as rotor, of the electric motor 14.

Figure 2:
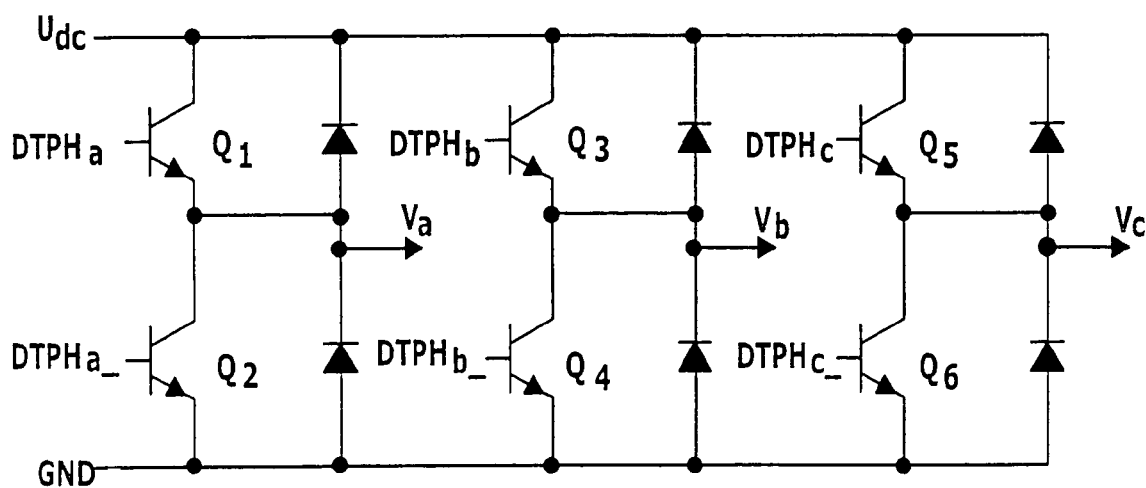
FIG. 2: is a circuit diagram of a three-phase power inverter.

FIG. 2 is a schematic representation of a three-phase power inverter, in which $V_a$, $V_b$ and $V_c$ represent the voltages applied to the motor windings. A total of six power transistors are connected in pairs in series and as pairs parallel to one another and are designated $Q_1$ to $Q_6$. In the circuit diagram, the switching states of the respective transistors $Q_1$ to $Q_6$ are designated $DTPH_x$, where x stands for a, b or c. Normally the lower transistor connected in series to the upper transistor is switched off when the upper transistor is switched on, and vice versa.

The circuit diagram shown in FIG. 2 corresponds both to the conventional pulse width modulation (PWM) and to the space vector pulse width modulation (SVPWM). The switching schemes of the two methods do, however, differ significantly.

Figure 3:
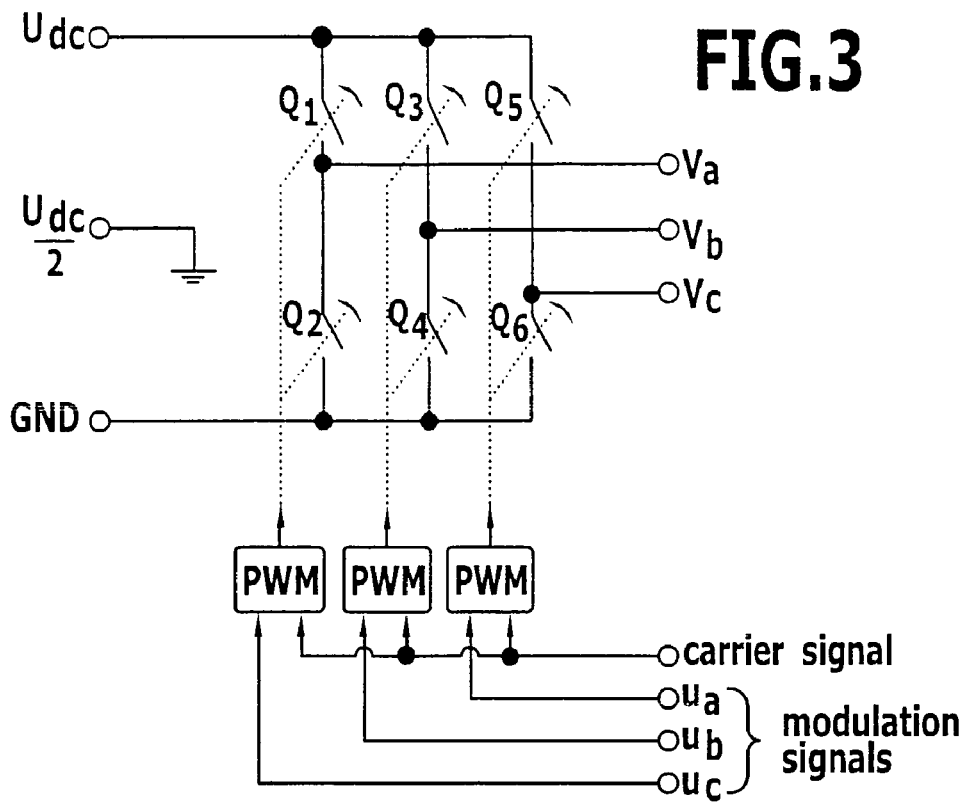
FIG. 3: is an operational diagram of a three-phase pulse width modulation inverter.
Figure 4:
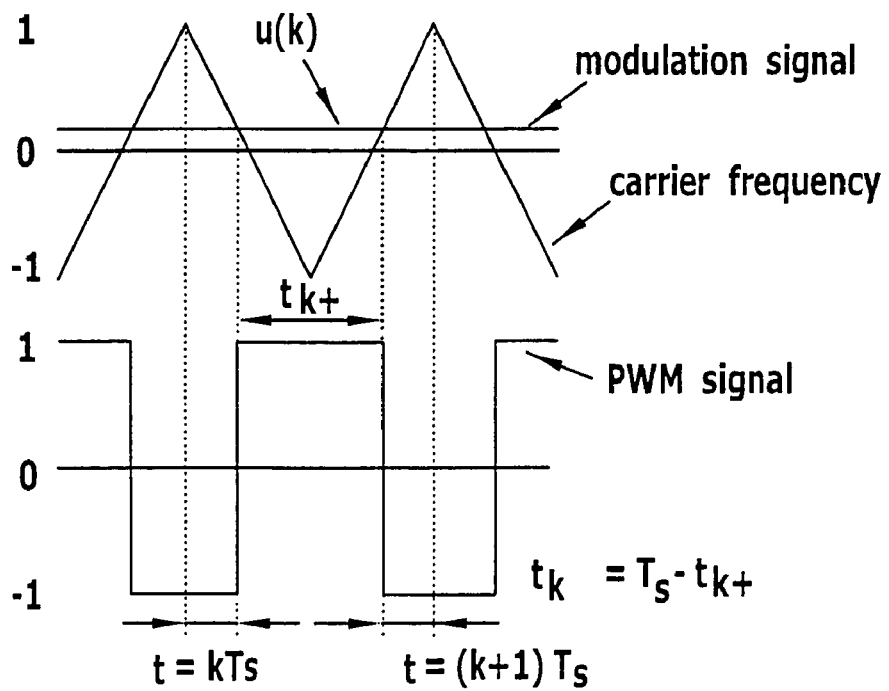
FIG. 4: is a diagrammatic representation of a carrier-based pulse width modulation.

In the conventional pulse width modulation (PWM) method, which will be described hereinbelow with reference to FIGS. 3 and 4, a modulation signal of each motor winding a, b and c is modulated onto a carrier frequency. The carrier frequency is selected as periodic saw tooth, so that the pulse width modulation signal results from the switching state being "1" when the carrier frequency signal lies below the modulation signal. The transistors $Q_1$ to $Q_6$ are then switched accordingly, with either the upper transistor $Q_1$, $Q_3$ or $Q_5$ or the lower transistor $Q_2$, $Q_4$ or $Q_6$ being respectively connected through. It will be readily understood that in the case of the conventional pulse width modulation (PWM) of a three-phase power inverter shown, by way of example, in FIGS. 3 and 4, at least one motor winding will always remain without a supply of electric current. This allows adjustment of a field angle γ of the stator field, which is built up by supplying the three motor windings with electric current, only in 60°-steps.

The space vector pulse width modulation (SVPWM) method differs from this. The switching scheme of the six transistors is shown schematically in FIG. 5. A so-called space vector in the space vector space is associated with each switching position. The space vector $S_0$ thus corresponds to a switching position 000, in which the three lower transistors $Q_2$, $Q_4$ and $Q_6$ are closed.

Figure 5:
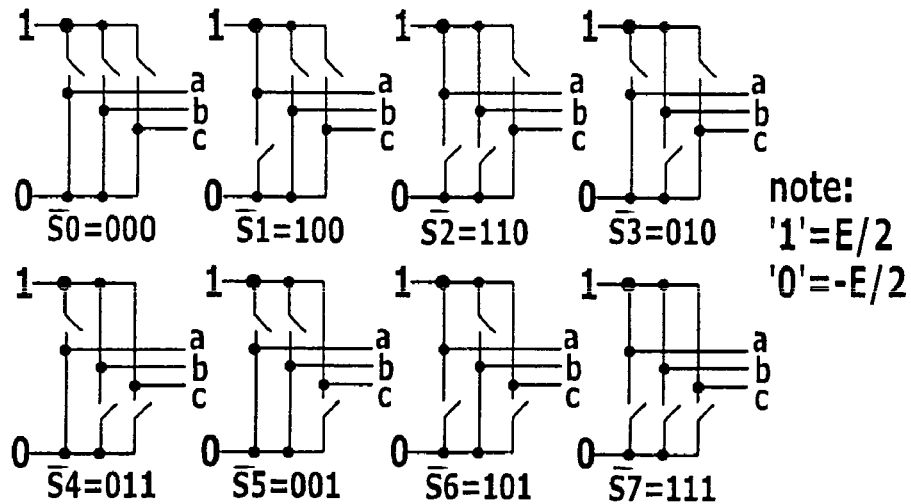
FIG. 5: is a schematic representation of eight switching states in the space vector pulse width modulation.
Figure 6:
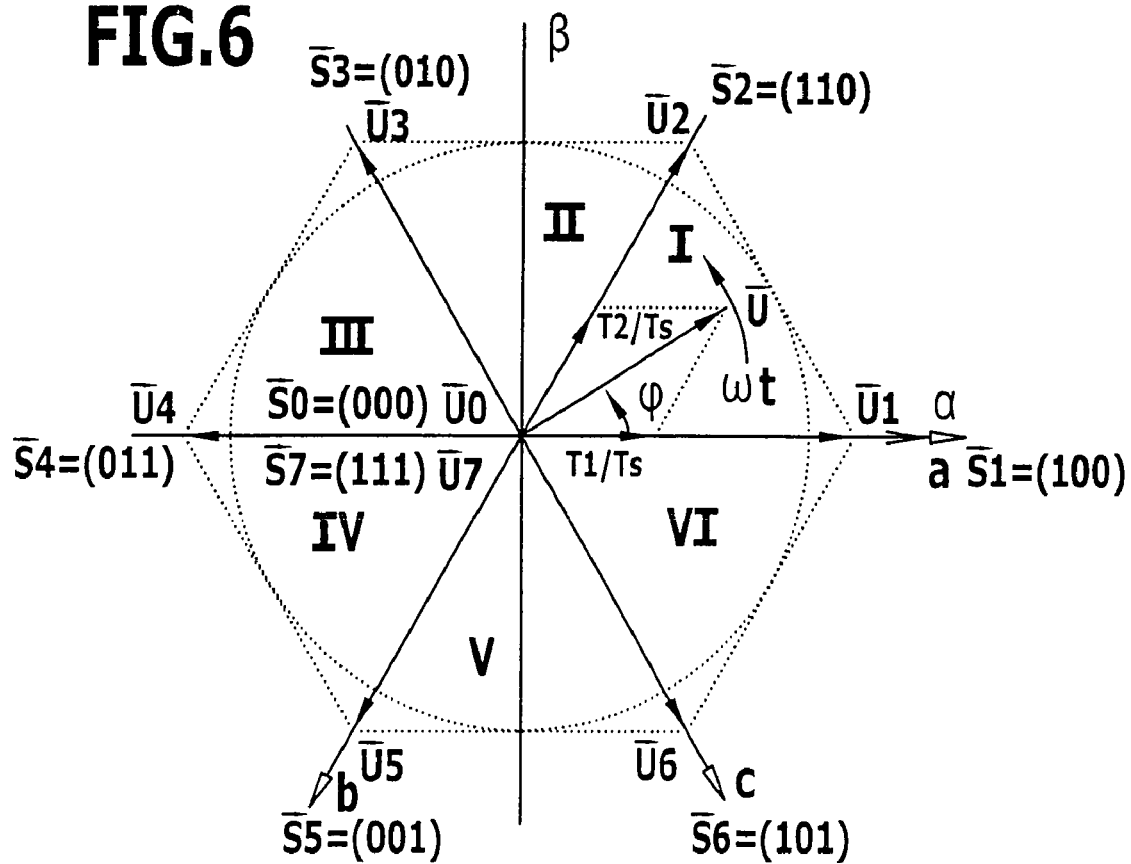
FIG. 6: is a schematic representation of the voltage vector space in the space vector pulse width modulation.

The space vectors indicated in FIG. 5 define the switching position of the transistor pairs connected in series, with a "0" meaning that the lower transistor is connected through, and a "1" that the upper transistor is connected through. There are a total of eight switching states, which can be respectively represented by a voltage vector $U_0$ to $U_7$, which respectively correspond to one of the eight switching states. Each voltage vector $U_1$ to $U_6$ has a length which corresponds to a unit vector, the length of the voltage vectors $U_0$ and $U_7$, on the other hand, is zero. The six voltage vectors $U_1$ to $U_6$ thus divide the voltage vector space into a total of six sectors, with the voltage vectors $U_1$ and $U_4$, $U_2$ and $U_5$, and $U_3$ and $U_6$ being respectively oppositely orientated and added in pairs to the zero vector.

An optional output voltage U can now be periodically infinitely varied by supplying all three motor windings accordingly with electric current. As a result, an optional angle γ of the stator field can be adjusted relative to the rotor of the electric motor, i.e., not only in 60°-steps as in the case of the above-described conventional pulse width modulation (PWM).

Figure 7:
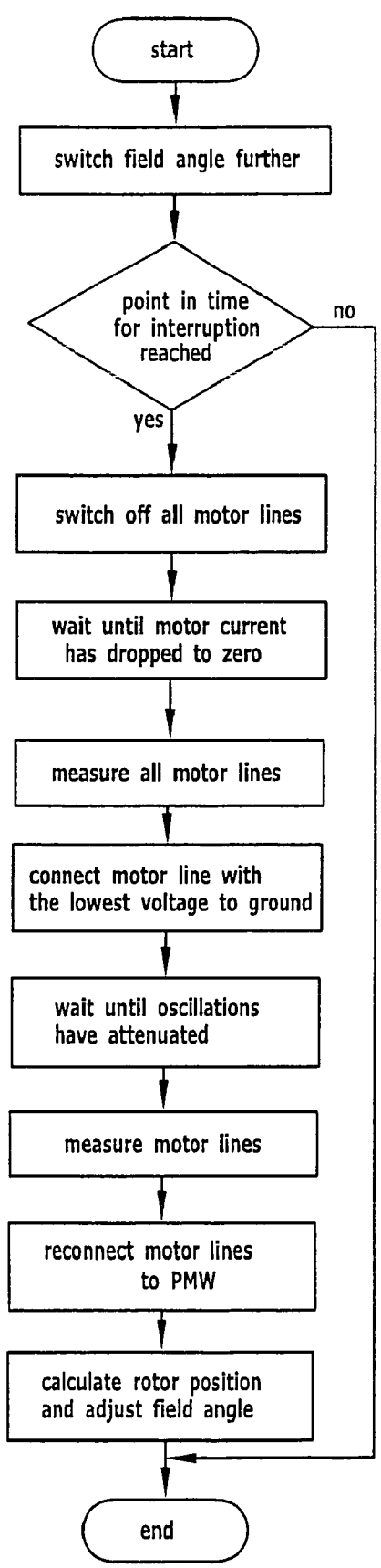
FIG. 7: is a flow diagram of the space vector pulse width modulation (SVPWM) method according to the invention for controlling and/or regulating a brushless DC motor.

However, in the case of the space vector pulse width modulation (SVPWM) a CEMF (counterelectromotive force) of the motor windings is not readily determinable because, in principle, all motor windings are simultaneously supplied with electric current. For this reason, the supply of electric current to at least one, preferably all, of the motor lines is interrupted for a short time. A corresponding flow diagram is shown in FIG. 7. The motor controller specifies the switching scheme of the space vector pulse width modulation (SVPWM) in accordance with a desired rotational speed as requested by an operator. This means that after putting the surgical machine into operation, a field angle γ of the stator field generated by the motor windings supplied with electric current is continuously switched further. The inquiry routine shown in FIG. 7 is called up for each pulse width modulation pulse. After starting the routine, the field angle of the stator field is first switched further. Two different frequencies are worked with in this operation. The frequency with which a supplying of the motor with electric current is interrupted is equal to or less than the pulse width modulation frequency. For example, the interruption frequency may be one kHz in the case of a pulse width modulation frequency of eight kHz. In other words, the pulse width modulation frequency is preferably a multiple, in particular, an integral multiple, of the interruption or sampling frequency. A superposition of two pulse width modulation frequencies thus occurs. In the case of the numerical example given hereinabove this means that the motor lines are switched off for a short time every eight revolutions of the rotor.

When, as shown in FIG. 7, the point in time is reached for an interruption in the supply of electric current, all motor lines are switched off. The next step is to wait until the motor current drops to zero. All motor lines or motor windings are then measured, and that motor line with the lowest voltage is applied to ground or connected to ground.

Next, the attenuation of oscillations that occur as a result of the switching procedures is awaited. All motor lines are then measured, i.e., the CEMF (counterelectromotive force) is simultaneously determined at all motor lines. After completion of the measurements, the motor lines are supplied with electric current again in accordance with the space vector pulse width modulation (SVPWM) method. From the measured CEMF (counterelectromotive force) values the rotor position is calculated and the field angle γ adjusted accordingly, which is done by a corresponding adaptation of the space vector pulse width modulation switching scheme.

Figure 8:
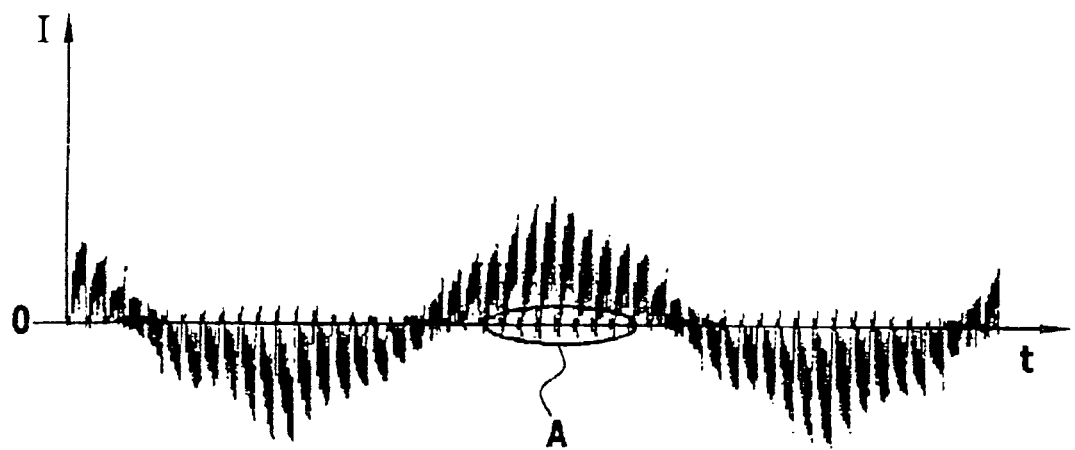
FIG. 8: is a schematic representation of the course of the current in a motor winding as a function of time.
Figure 9:
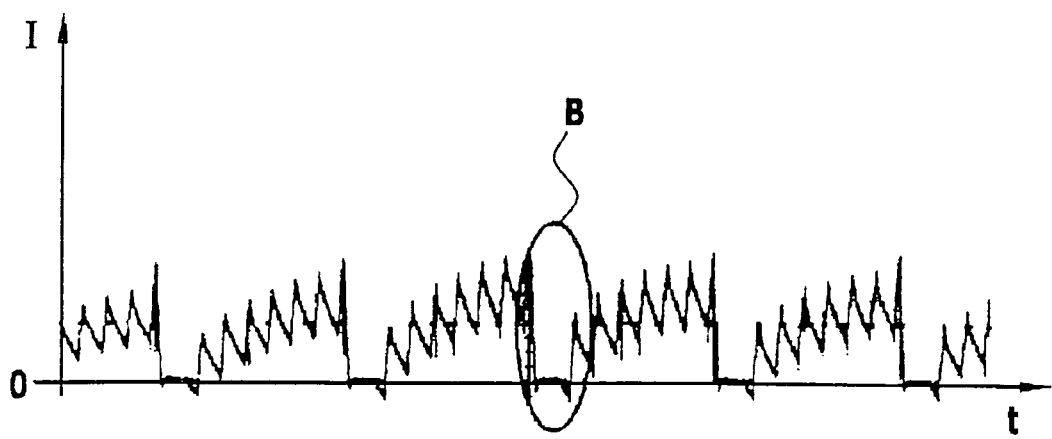
FIG. 9: is a representation of the course of the current in section A in FIG. 8 with a ten times higher time resolution.

A quasi sinusoidal course of the phase current can be generated at each motor line by the space vector pulse width modulation. The phase current at a motor line is shown, by way of example, in FIG. 8 for somewhat more than one revolution of the rotor. The blurred areas are due to the pulse width modulation. In the area marked A, periodic interruptions are recognizable, in which the phase current drops to zero. This is additionally shown on an enlarged scale in FIG. 9, with a ten times higher time resolution. The dark areas shown in FIG. 8 are now more clearly recognizable. A pulse width modulation signal is generated periodically, as stated above, with an eight times higher frequency than the interruption frequency. At every eighth PMW pulse, however, the supply of electric current to the motor is interrupted, i.e., the phase current drops to zero, which is clearly recognizable in the area designated B in FIG. 9.

Figure 10:
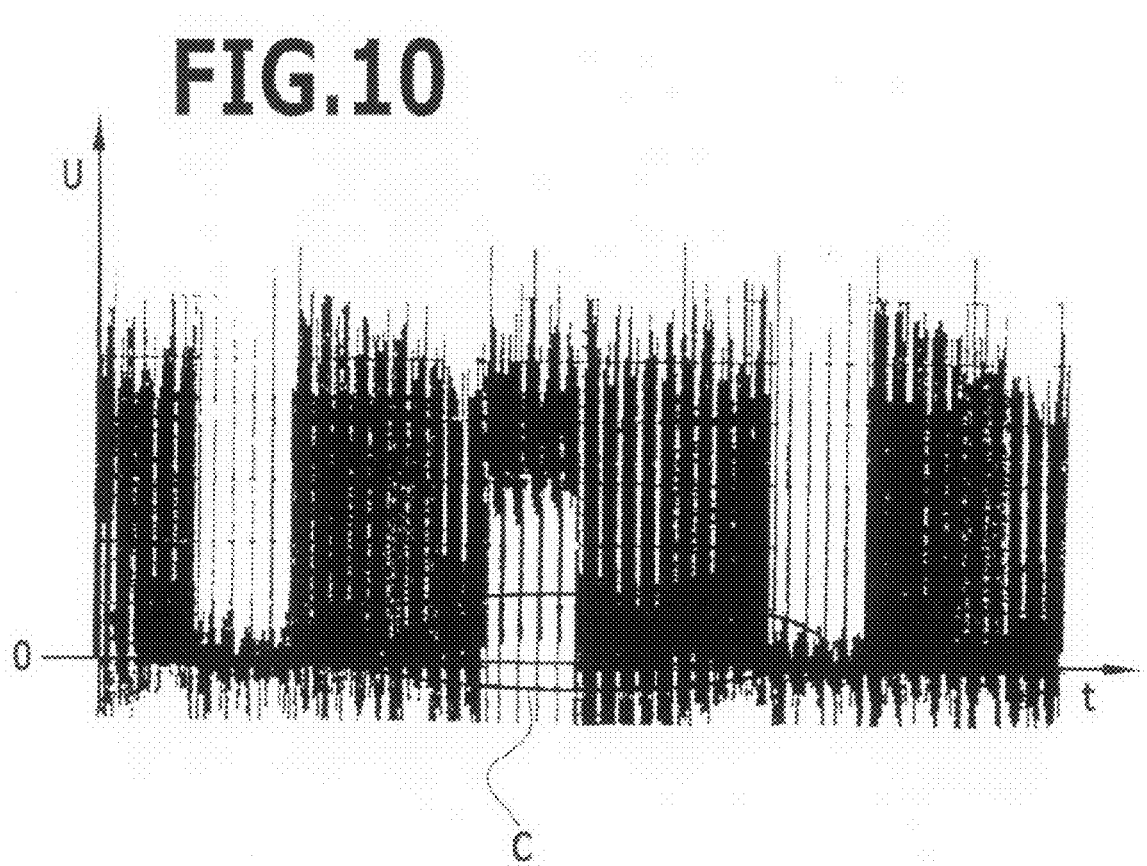
FIG. 10: is a schematic representation of the course of the voltage of a motor winding in relation to ground of the power supply.
Figure 11:
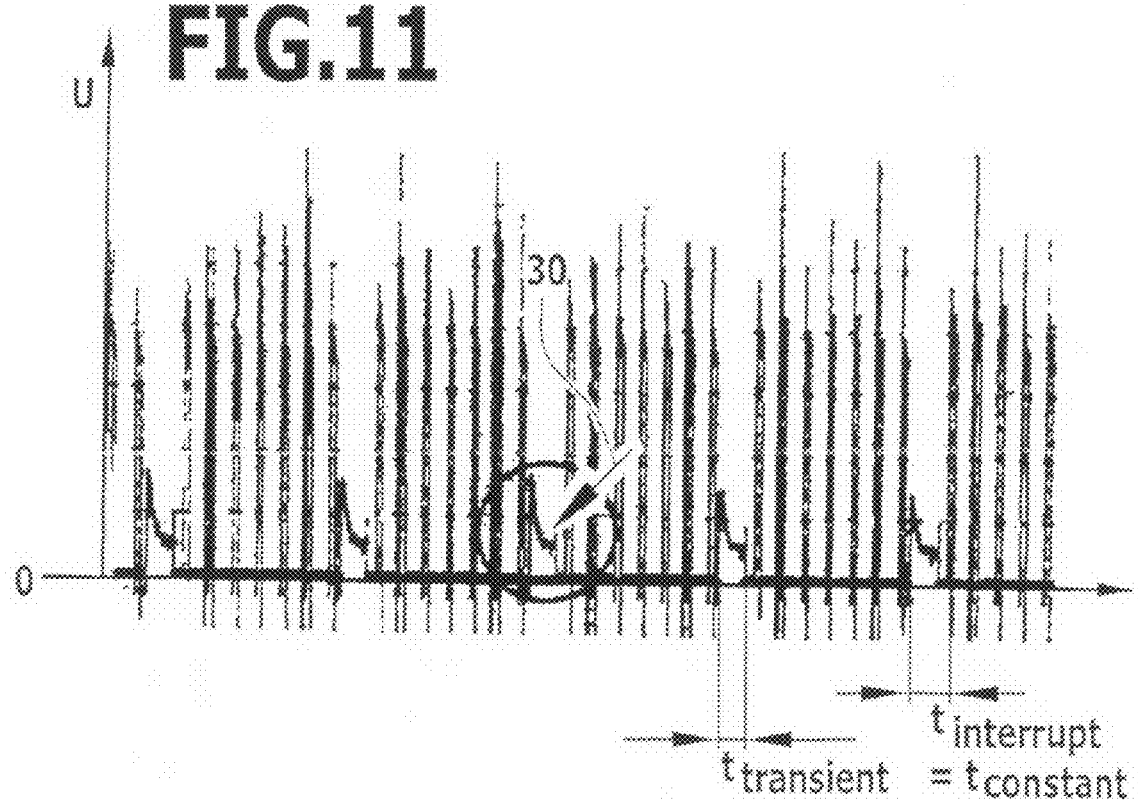
FIG. 11: shows the course of the voltage from FIG. 10, but with a ten times higher time resolution.

The course of the voltage of a motor winding in relation to ground of the battery 22 is shown in FIGS. 10 and 11. The picture shows a very high noise level owing to the pulse width modulation. In the area designated C, a sinusoidal CEMF (counterelectromotive force) of the motor is recognizable in the interruptions of the pulse width modulation. The course of the voltage from FIG. 10 is shown again in FIG. 11, but with a ten times higher time resolution. The pulse width modulation superposed by interference peaks is recognizable.

In the interruptions of the power supply described hereinabove, i.e., instead of each eighth pulse, a voltage course of the CEMF (counterelectromotive force) of the motor winding is recognizable. The CEMF (counterelectromotive force), i.e., the voltage induced in the motor winding on account of rotation of the rotor levels off to an approximately constant value after a transient time $t_{transient}$. The CEMF (counterelectromotive force) can be measured at the end of the transient phenomenon. This happens in the same way and at the same time for all three motor windings, so that both an actual rotational speed of the electric motor 14 and a rotational position of the rotor of the electric motor 14 can be calculated from the three CEMF (counterelectromotive force) values determined.

Figure 12:
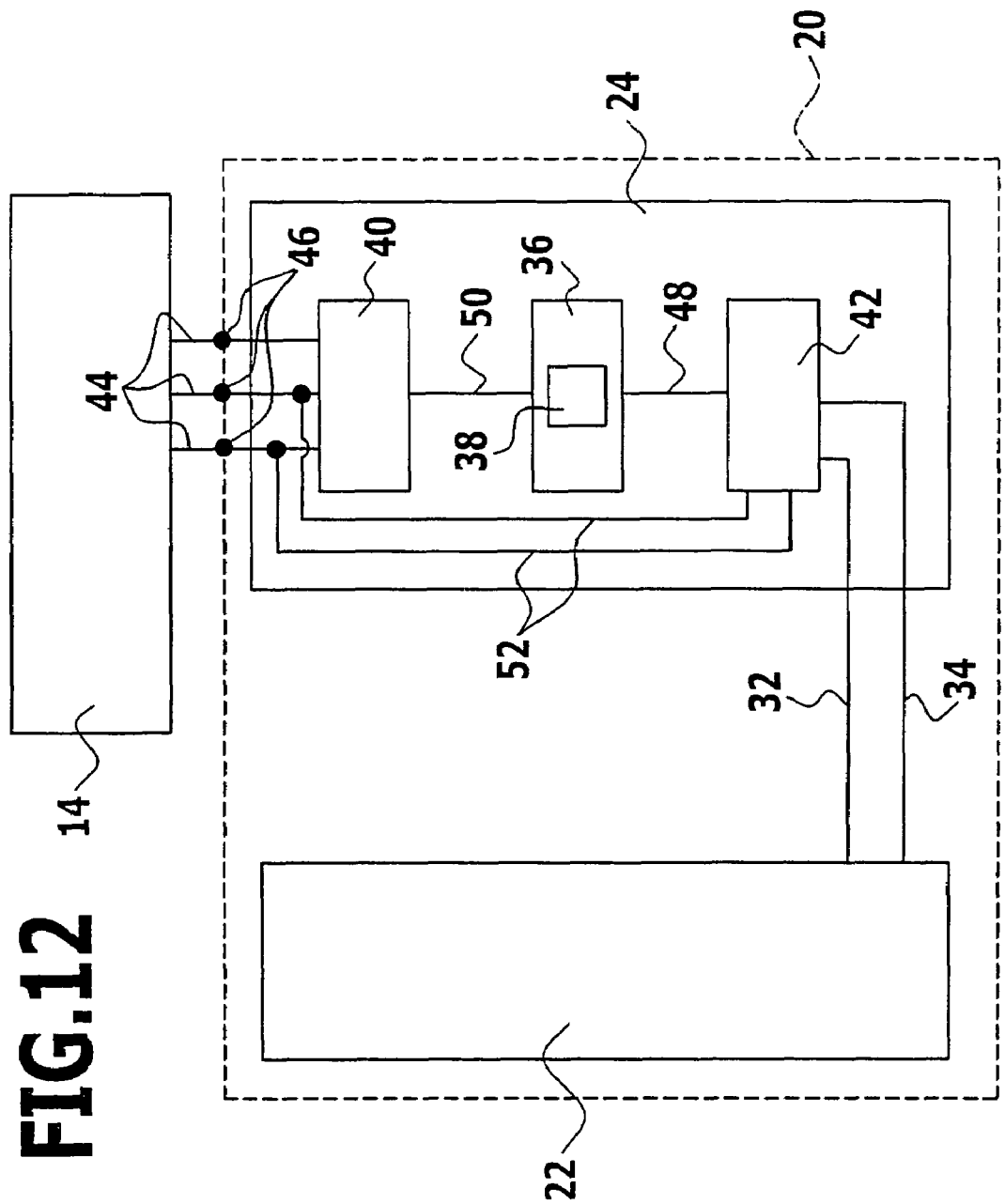
FIG. 12: is a schematic diagram of an accumulator/motor controller unit.

FIG. 12 shows diagrammatically the construction of the battery pack 20. As mentioned at the outset, it comprises the battery 22 and the motor controller 24. The motor controller 24 comprises, inter alia, three main circuit components, namely a processor unit 36 with a digital signal processor 38, a power stage 40 with the six power transistors $Q_1$ to $Q_6$ and an interruption switching unit 42. The interruption switching unit 42 is connected to the battery 22 by two lines 32 and 34. Furthermore, the interruption switching unit is connected to two of the three connection lines 44 of the electric motor 14. The connection lines 44 are detachably connectable to the power pack 20 via three contacts. Furthermore, the interruption switching unit 42 and the processor unit 36 are connected, which is symbolized diagrammatically by the line 48. The processor unit 36 is connected to the power stage 40, which is symbolized diagrammatically by the line 50.

The interruption switching unit serves to separate the digital signal processor 38 of the processor unit 36 from the battery 22 when the power pack 20 is not connected to the electric motor 14. For this purpose, the interruption switching unit 42 is connected via two lines 52 to two contact points 46 of the power pack 20, which are connected to two connection lines 44 of the electric motor when the power pack 20 is pushed into the handle 18 of the housing 12 of the accumulator machine 10. Only after connection of the power pack 20 to the electric motor 14 does the interruption switching unit 42 release the processor unit 36, i.e., the latter is connected to the battery 22. In this way, a self-discharge of the battery 22 is prevented, as the processor unit 36, which has a high energy consumption, is out of operation in a storage state, i.e., when the power pack 20 is not connected to the electric motor 14.

As described at the outset, position sensors can, in principle, be used to determine an actual rotational speed of the electric motor 14 or to detect the rotor position. But, in the case of the accumulator machine 10 proposed in accordance with the invention, precisely such sensors are dispensed with. A very accurate determination of the rotational speed and the rotor position is, however, possible with identification methods. Luenberger observers or Kalman filters are examples of these. Since the digital signal processor 38 is a processor with a very rapid and high computing power, a rotational speed or a rotor position can be detected very precisely.

Figure 13:
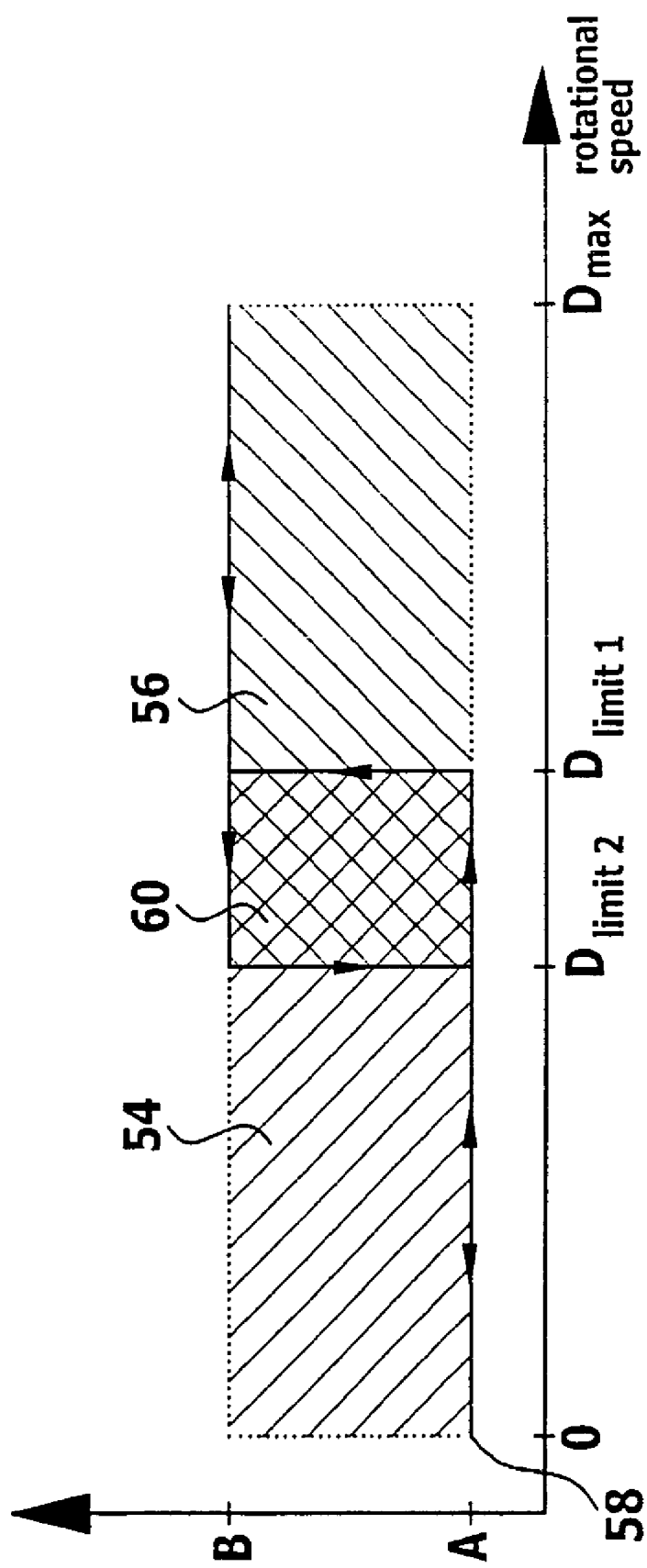
FIG. 13: is a switching diagram of a motor controller of the accumulator machine shown in FIG. 1.

The motor controller 24 is so designed that a rotational speed range of the electric motor 14 is divided into two partial ranges, namely, a lower rotational speed range 54 and an upper rotational speed range 56, as shown diagrammatically in FIG. 13. Furthermore, the motor controller 24 allows two different controlling and/or regulating methods for operating the electric motor 14 to be performed. This is, firstly, a space vector pulse width modulation (SVPWM) method, which is schematically designated by A in FIGS. 13 and 14. Secondly, this is a conventional pulse width modulation (PWM) method, which is diagrammatically designated by B in FIGS. 13 and 14.

In the case of an electric motor 14 with a rotational speed detection system comprising position sensors and rotational speed detection sensors, the controlling and/or regulating method A could also be a controlling and/or regulating method in which an actual rotational speed of the electric motor 14 is determined by means of the rotational speed detection sensors and processed by the motor controller 24. In the space vector pulse width modulation (SVPWM) method and also in the conventional pulse width modulation (PWM) method an actual rotational speed of the electric motor 14 is determined by detecting the CEMF (counterelectromotive force).

The procedure when switching over from controlling and/or regulating method A to controlling and/or regulating method B will be explained in greater detail hereinbelow with reference to FIGS. 13 and 14.

The accumulator machine 10 is put into operation by an operator actuating the power/speed push-button 26. Start/stop is designated by reference numeral 58 in FIG. 13. When the operator increases the rotational speed of the electric motor 14, the motor controller 24 performs the controlling and/or regulating method A until the switchover rotational speed $D_{limit1}$ is reached. Once the switchover rotational speed $D_{limit1}$, is reached, the motor controller 24 automatically switches over to the controlling and/or regulating method B. The electric motor 14 is operated by the motor controller 24 in the controlling and/or regulating method B until the maximum rotational speed $D_{max}$ of the electric motor 14 is reached. If the rotational speed requirement for the electric motor 14 is reduced again by the operator, the controlling and/or regulating method B is still maintained for rotational speeds of the electric motor 14 that are lower than the switchover rotational speed $D_{limit1}$ until the switchover rotational speed $D_{limit2}$ is reached. Only when the switchover rotational speed $D_{limit2}$ is reached and fallen short of, does the motor controller 24 switch over to the controlling and/or regulating method A again. If the rotational speed requirement is increased again, a switchover to the controlling and/or regulating method B does, however, only take place again after the switchover rotational speed $D_{limit1}$ is exceeded.

As a result of this switching scheme, there is formed between the lower rotational speed range 54 and the upper rotational speed range 56 in FIG. 13 an overlapping range, which is designated in its entirety by reference numeral 60. In the overlapping range 60, the motor controller 24 can perform both the controlling and/or regulating method A and the controlling and/or regulating method B. Which method is carried out, will depend on whether the rotational speed requirement is increased from an actual rotational speed below the switchover rotational speed $D_{limit2}$ or is lowered from above the switchover rotational speed $D_{limit1}$. All in all, this results in the hysteresis-like curve shown in FIG. 13, on which it is possible to move around the overlapping range 60 in the counter-clockwise direction.

Figure 14:
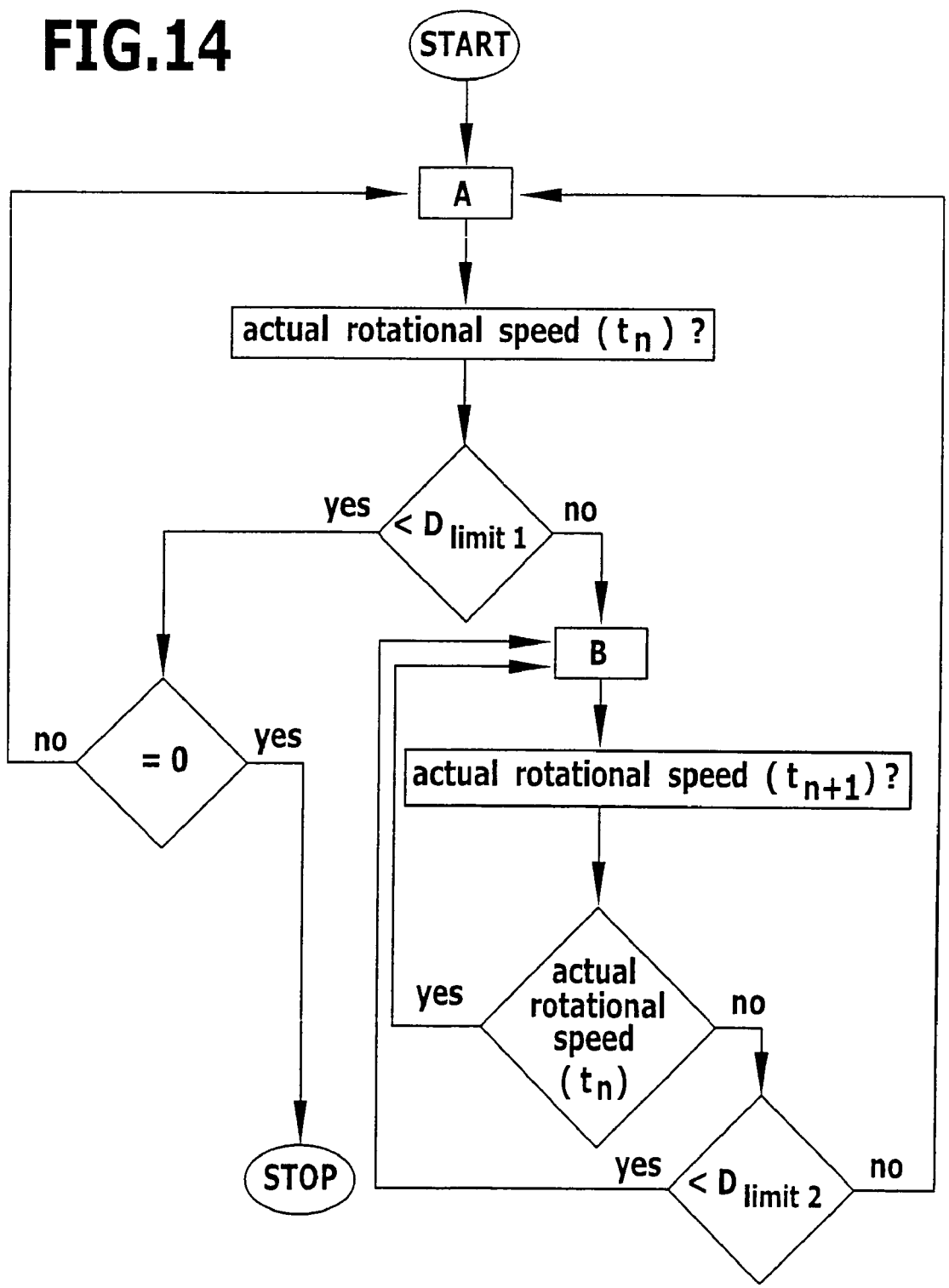
FIG. 14: is a flow diagram corresponding to the switching diagram in FIG. 13 for operation of the accumulator machine shown in FIG. 1.

The mode of operation of the motor controller 24 for switching over between the two controlling and/or regulating methods A and B will become apparent from FIG. 14. The starting point is an electric motor 14 at a standstill. When it is started, the motor controller 24 carries out the controlling and/or regulating method A. The actual rotational speed at the point in time $t_n$ is determined at periodic intervals. After determining the actual rotational speed at the point in time $t_n$, it is inquired whether the actual rotational speed is less than the switchover rotational speed $D_{limit1}$. If the rotational speed is less than the switchover rotational speed $D_{limit1}$, it is then inquired whether the rotational speed is equal to 0. If this is the case, the motor controller 24 then stops operation of the electric motor 14. If the actual rotational speed is less than the switchover rotational speed $D_{limit1}$, but greater than 0, the controlling and/or regulating method A is then carried out further.

If the actual rotational speed determined at the point in time $t_n$ is greater than the switchover rotational speed $D_{limit1}$, the motor controller 24 then switches over to the controlling and/or regulating method B. The actual rotational speed at the point in time $t_{n+1}$ is kept on being determined at periodic intervals and subsequently compared with the previously determined actual rotational speed at the point in time $t_n$. If the actual rotational speed at the point in time $t_{n+1}$ is greater than the actual rotational speed at the point in time $t_n$, the motor controller 24 then continues to carry out the controlling and/or regulating method B. If, however, the actual rotational speed at the point in time $t_{n+1}$ is less than the actual rotational speed at the point in time $t_n$, the actual rotational speed is then compared with the switchover rotational speed $D_{limit2}$. If the actual rotational speed is greater than the switchover rotational speed $D_{limit2}$, the motor controller then continues to carry out the controlling and/or regulating method B. Otherwise the motor controller 24 automatically switches over to the controlling and/or regulating method A.

The switchover between the two controlling and/or regulating methods A and B has, in particular, the advantage that a space vector pulse width modulation (SVPWM) method carried out at low rotational speeds, which shows undesirable damping effects at high rotational speeds, which result in motor losses and a negative influence on the efficiency of the accumulator machine 10, need not be used at high rotational speeds.

Hardware- or software-based implementation of the two controlling and/or regulating methods A and B in the motor controller is possible.

What is claimed is:

1. Surgical machine, comprising:
  a sensorless electric motor comprising a rotor and at least two motor windings, and
  a motor controller for at least one of controlling and regulating the electric motor,
  wherein a space vector pulse width modulation (SVPWM) method (A) for said at least one of controlling and regulating the electric motor, in which all motor windings are able to be simultaneously supplied with electric current, is performable with the motor controller.

2. Machine in accordance with claim 1, wherein the motor controller comprises a control unit and a power unit.

3. Machine in accordance with claim 2, wherein the power unit respectively comprises two power transistors for each of the at least two motor windings.

4. Machine in accordance with claim 1, wherein the electric motor is an electronically commutated brushless DC motor.

5. Machine in accordance with claim 1, wherein a rotor position of the electric motor is determinable for said at least one of controlling and regulating the supplying of the at least two motor windings with electric current.

6. Machine in accordance with claim 1, wherein a mains-independent power is provided for supplying the machine with power.

7. Machine in accordance with claim 6, wherein the mains-independent power supply and the motor controller form a unit, and the unit is detachably connectable to the machine.

8. Machine in accordance with claim 6, wherein the motor controller comprises a connection circuit, which does not connect a processor of the motor controller to the mains-independent power supply until the electric motor is connected to the motor controller.

9. Machine in accordance with claim 1, wherein the electric motor comprises three motor windings.

10. Surgical machine comprising:
  an electric motor comprising a rotor and at least two motor windings, and
  a motor controller for at least one of controlling and regulating the electric motor,
wherein:
  an entire rotational speed range of the surgical machine is divided into at least one lower rotational speed range for low rotational speeds and at least one upper rotational speed range for higher rotational speeds than the speeds in the at least one lower rotational speed range,
  the motor controller is adapted so that a first method (A) for said at least one of controlling and regulating the electric motor is performable in the at least one lower rotational speed range, and a second method (B) for said at least one of controlling and regulating the electric motor is performable in the at least one upper rotational speed range.

11. Machine in accordance with claim 10, wherein at least one of the first method (A) and the second method (B) is a pulse width modulation (PWM) method.

12. Machine in accordance with claim 10, wherein:
  the electric motor further comprises rotational speed detection sensors, and
  the motor controller is adapted so that the first method (A) is a method for said at least one of controlling and regulating the surgical machine in which the motor controller provides control signals for the electric motor in dependence upon an actual rotational speed determined with the rotational speed detection sensors.

13. Machine in accordance with claim 10, wherein the motor controller is adapted so that a switchover from the first method (A) to the second method (B) takes place at a first switchover rotational speed ($D_{limit1}$), and a switchover from the second method (B) to the first method (A) takes place at a second switchover rotational speed ($D_{limit2}$).

14. Machine in accordance with claim 10, wherein the motor controller is adapted so that the switchover from the first method (A) to the second method (B) takes place automatically at the transition from the at least one lower rotational speed range to the at least one upper rotational speed range, and vice versa.

15. Method for operating a surgical machine with an electric motor comprising a rotor and at least two motor windings, and with a motor controller for at least one of controlling and regulating the electric motor, said method comprising:
  dividing the entire rotational speed range of the surgical machine into at least one lower rotational speed range for low rotational speeds and at least one upper rotational speed range for higher rotational speeds than those in the at least one lower rotational speed range,
  performing a first method for said at least one of controlling and regulating the electric motor in the at least one lower rotational speed range, and
  performing a second method for said at least one of controlling and regulating the electric motor in the at least one upper rotational speed range.

16. Method in accordance with claim 15, wherein at least one of the first method or the second method is a pulse width modulation (PWM) method.

17. Method in accordance with claim 15, wherein the first method is a space vector pulse width modulation (SVPWM) method, in which all motor windings are simultaneously supplied with electric current.

18. Method in accordance with claim 15, wherein an electric motor, which is a brushless DC motor, is used.

19. Method in accordance with claim 15, wherein an electric motor, which is a sensorless electric motor, is used.

20. Method in accordance with claim 15, wherein:
  the motor further comprises rotational speed detection sensors, and the first method is a method for said at least one of controlling and regulating the surgical machine in which the motor controller provides control signals for the electric motor in dependence upon an actual rotational speed determined with the rotational speed detection sensors.

21. Method in accordance with claim 20, wherein a Hall system is provided for detecting the actual rotational speed of the electric motor, and the Hall system comprises the rotational speed detection sensors.

22. Method in accordance with claim 15, wherein a rotational speed limit value between the at least one lower rotational speed range and the at least one upper rotational speed range remains unaltered during operation of the machine.

23. Method in accordance with claim 15, wherein a rotational speed limit value between the at least one lower rotational speed range and the at least one upper rotational speed range is altered during operation of the machine.

24. Method in accordance with claim 15, wherein a switchover from the first method to the second method takes place at a first switchover rotational speed, and a switchover from the second method to the first method takes place at a second switchover rotational speed.

25. Method in accordance with claim 24, wherein the first switchover rotational speed is equal to or greater than the second switchover rotational speed.

26. Method in accordance with claim 15, wherein the switchover from the first method to the second method takes place automatically at the transition from the at least one lower rotational speed range to the at least one upper rotational speed range, and vice versa.

27. Method in accordance with claim 15, wherein an electric motor with three motor windings is used.

* * * * *